United States Patent
Shanthikumar

(10) Patent No.: US 11,708,952 B2
(45) Date of Patent: Jul. 25, 2023

(54) PORTABLE SOLAR-POWERED CAMPING LIGHT

(71) Applicant: Sathurukulasingam Shanthikumar, Fallbrook, CA (US)

(72) Inventor: Sathurukulasingam Shanthikumar, Fallbrook, CA (US)

( * ) Notice: Subject to any disclaimer, the term of this patent is extended or adjusted under 35 U.S.C. 154(b) by 4 days.

(21) Appl. No.: 17/685,614

(22) Filed: Mar. 3, 2022

(65) Prior Publication Data

US 2022/0381411 A1 Dec. 1, 2022

Related U.S. Application Data

(60) Provisional application No. 63/195,034, filed on May 30, 2021.

(51) Int. Cl.

| *F21S 9/00* | (2006.01) |
| *F21S 9/03* | (2006.01) |
| *F21V 23/06* | (2006.01) |
| *H02J 7/02* | (2016.01) |
| *H02J 7/35* | (2006.01) |
| *F21Y 115/10* | (2016.01) |

(52) U.S. Cl.
CPC ............ *F21S 9/037* (2013.01); *F21V 23/06* (2013.01); *H02J 7/02* (2013.01); *H02J 7/35* (2013.01); *F21Y 2115/10* (2016.08)

(58) Field of Classification Search
CPC ...... H02J 7/02; H02J 7/35; F21S 9/037; F21L 4/08; F21V 23/00435; F21V 23/06
See application file for complete search history.

(56) References Cited

U.S. PATENT DOCUMENTS

| 5,231,781 A * | 8/1993 | Dunbar ................. A01K 93/02 362/183 |
| 2006/0279956 A1* | 12/2006 | Richmond .............. F21V 15/01 362/803 |
| 2007/0183143 A1* | 8/2007 | Allsop .................... F21V 3/023 362/183 |
| 2008/0175006 A1* | 7/2008 | Kellmann ............... F21V 3/023 362/363 |
| 2010/0214774 A1* | 8/2010 | Liu ....................... B65D 51/248 362/183 |
| 2010/0271802 A1* | 10/2010 | Recker ................... H05B 45/12 362/20 |
| 2012/0224359 A1* | 9/2012 | Chun ...................... F21V 3/049 362/183 |

(Continued)

*Primary Examiner* — Gerald J Sufleta, II

(57) ABSTRACT

This invention is a compact and portable solar-powered camping light/lamp that utilizes recent advances in bulb and battery technology to produce high-intensity light continuously for up to 12 hours. It is well-suited for use during camping trips, in remote off-grid cabins, homes, and emergencies. The device incorporates a 12V solar panel that charges a standard 12V 12-18 Ah Li-ion (LiFePO4) or Lead-acid battery. The 12V DC battery current is then converted by an inverter to produce 120V AC, which is fed to a standard 120V 15 W LED bulb, producing 1500 lumens of high-intensity light continuously for 9-12 hours. The device is equipped with a cooling fan, can be conveniently carried by its handle, and can be charged using an automobile or other 12V source and also at home with a 120V AC to 12V DC step-down adapter.

20 Claims, 3 Drawing Sheets

(56) References Cited

U.S. PATENT DOCUMENTS

| | | | |
|---|---|---|---|
| 2013/0094191 A1* | 4/2013 | Cohen | F21V 21/08 |
| | | | 362/122 |
| 2013/0187569 A1* | 7/2013 | Chin-Huan | F21V 23/0492 |
| | | | 315/307 |
| 2013/0335953 A1* | 12/2013 | Gold | C02F 1/76 |
| | | | 362/190 |
| 2014/0049942 A1* | 2/2014 | Chilton | F21L 4/00 |
| | | | 362/96 |
| 2015/0009657 A1* | 1/2015 | Bah | F21V 17/164 |
| | | | 362/183 |
| 2015/0131263 A1* | 5/2015 | Stork | F21V 3/02 |
| | | | 362/183 |
| 2018/0017241 A1* | 1/2018 | Grider | F21L 4/08 |
| 2018/0128438 A1* | 5/2018 | Sreshta | F21S 9/037 |
| 2019/0137056 A1* | 5/2019 | Sreshta | H05B 47/19 |
| 2019/0149088 A1* | 5/2019 | Chaturvedi | H02S 40/38 |
| | | | 320/101 |
| 2019/0326774 A1* | 10/2019 | Moellenberg | H02J 7/35 |

\* cited by examiner

PORTABLE SOLAR-POWERED CAMPING LIGHT

TECHNICAL FIELD

This document generally describes a portable solar-powered lamp, or light, that, in addition to providing lighting, can also power external devices with electrical power and be powered by external devices.

BACKGROUND

Portable solar lights, lamps, and lanterns are widely used in various situations, such as camping trips, remote off-grid cabins and homes, and emergencies. However, currently available portable "solar lights" have a low light output, typically less than 1000 lumens. They use 12V or lower voltage bulbs and are powered by either solar panels and rechargeable batteries or regular one-time-use batteries. The batteries and bulbs used in portable solar lamps, lights, and lanterns may vary widely in voltage and light output, but they usually consist of a 12V or 6V rechargeable battery and a 12V or 6V fluorescent or LED bulb.

These typical "solar lights" are charged by a solar panel that produces electricity (12V/6V DC) when exposed to sunlight, charging the 12V/6V rechargeable battery during the day. At night, the charged battery powers a 12V/6V fluorescent or LED bulb in the lamp, producing light with a typically low output of less than 1000 lumens.

Currently, there is a deficit of compact portable solar lamps, lights, or lanterns specifically designed to use solar panels to charge a rechargeable battery that can continuously produce more than 1000 lumens of light for more than 3-4 hours. The invention is designed to overcome these shortcomings and can produce 1500 lumens of high-intensity (5000K, daylight equivalent) light output continuously for about 9-12 hours. The current invention is also equipped with a standard 120V AC outlet for use with any 120V AC device consuming 100 W or less (e.g., laptop computer, electric shaver, etc.) for short periods and standard USB 3.0 and USB-C outlets. The typical LED bulb used in this portable solar-powered lamp (i.e., the invention) has a lifespan of 10,000 hours, and the battery has a lifespan of about 9-10 years for the Li-on (LiFePO$_4$) battery and 1-2 years for the deep cycle Lead-acid battery. The high light output of 1500 lumens (equivalent to a 100 watt incandescent bulb) and the long duration of light output continuously for 9-12 hours (and the long lifespan of the bulb and battery) make the invention an excellent tool for providing high-intensity light on camping trips, in remote off-grid locations, and emergencies.

SUMMARY

The invention is a portable solar-powered lamp utilizes a 12V DC electric current from a 15-25 Watt solar panel to charge a 12-18 Ah Li-ion (LiFePO$_4$) or deep cycle Lead-acid battery. The 12V DC current from the battery is then fed to a standard 150 W 12V to 120V inverter module to produce 120V AC, which is used to power a standard 15 W 120V LED bulb to produce 1500 lumens of 5000K light continuously for 9-12 hours. In addition to the standard 120V AC outlet, the invention also features standard USB 3.0 and USB 'C' outlets and a built-in cooling fan. It can be charged using a 12V 15-25 W solar panel exposed to 8-10 hours of sunlight, or via a cigarette lighter socket in a vehicle or a 120V AC to 12V DC step-down adapter at home.

The design of the invention provides excellent daylight-type (5000K) light of 1500 lumens continuously for 9-12 hours, making it an ideal choice for camping trips, remote off-grid cabins, homes, and emergencies. Recent advances in bulb and battery technologies have been used to create a compact, portable light with an output of 1500 lumens of high-intensity light continuously for 9-12 hours. The bulb and battery are easily accessible for replacement or change, and the LED bulb and Li-ion (LiFePO$_4$) or deep cycle Lead-acid batteries are widely available. The typical LED bulb used in this device has a lifespan of about 10,000 hours, while the Li-ion (LiFePO$_4$) battery has a lifespan of 9-10 years and the deep cycle Lead-acid battery has a lifespan of 1-2 years.

DETAILED DESCRIPTION

Figure 1:
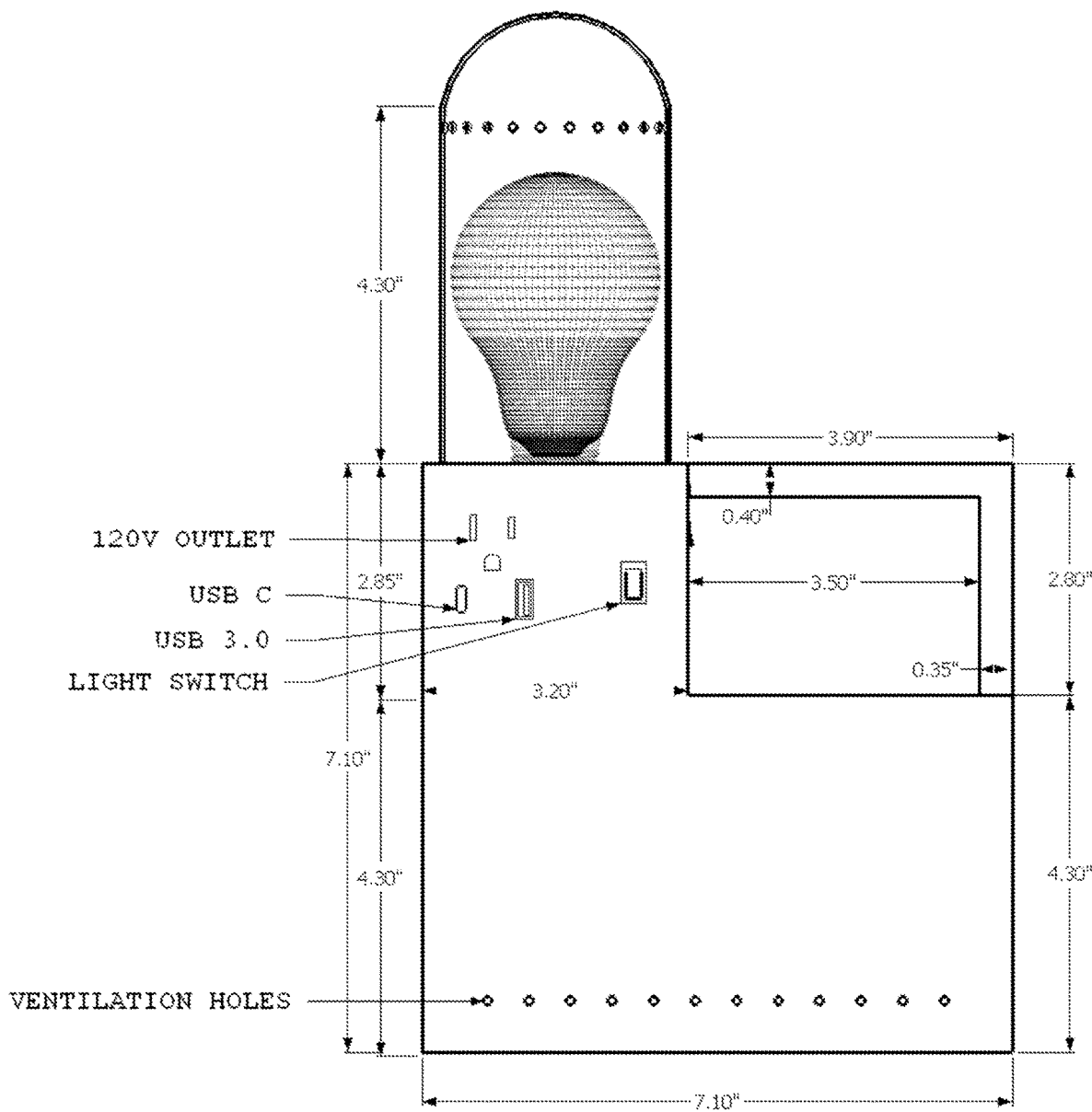
FIG. 1 shows the left side view of the invention.
Figure 2:
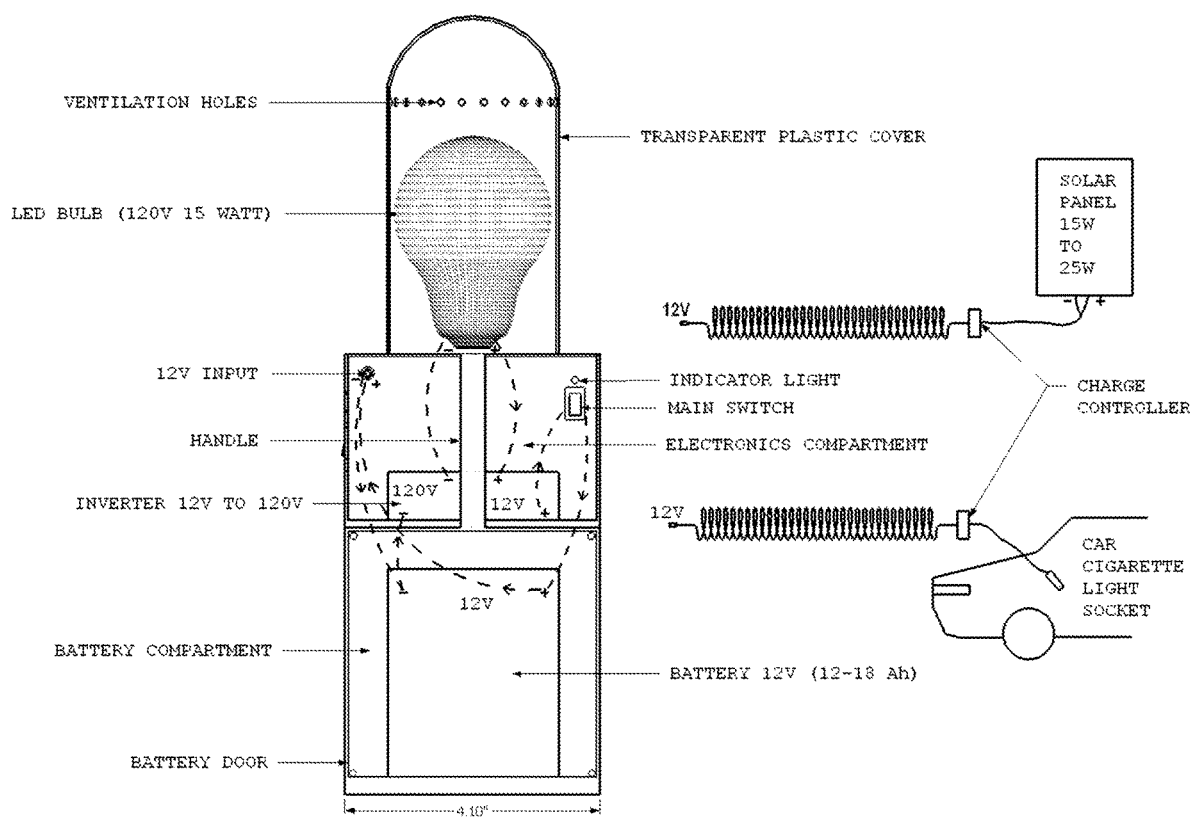
FIG. 2 is a front view of the invention

As depicted in FIG. 2, the invention has a rigid body composed of a top polygonal part integrally formed with a bottom polygonal part, in the embodiment shown in FIG. 2 the top polygonal part and bottom polygonal part are shown with a single main exterior portion/surface formed as an outer plastic shell with dimensions: length=7.1 inches (180 mm), width=4.1 inches (105 mm) and height=7.1 inches (180 mm). It has a handle as shown in the FIGS. 1-3 extending from the bottom polygonal part to a first side surface of a top polygonal part. The shell encloses within the bottom polygonal part a rechargeable 12V 12-18 Ah battery (also referred to as "battery") in the battery compartment while a 150 W 12V DC to 120V AC inverter module is housed in the electronics compartment.

Figure 3:
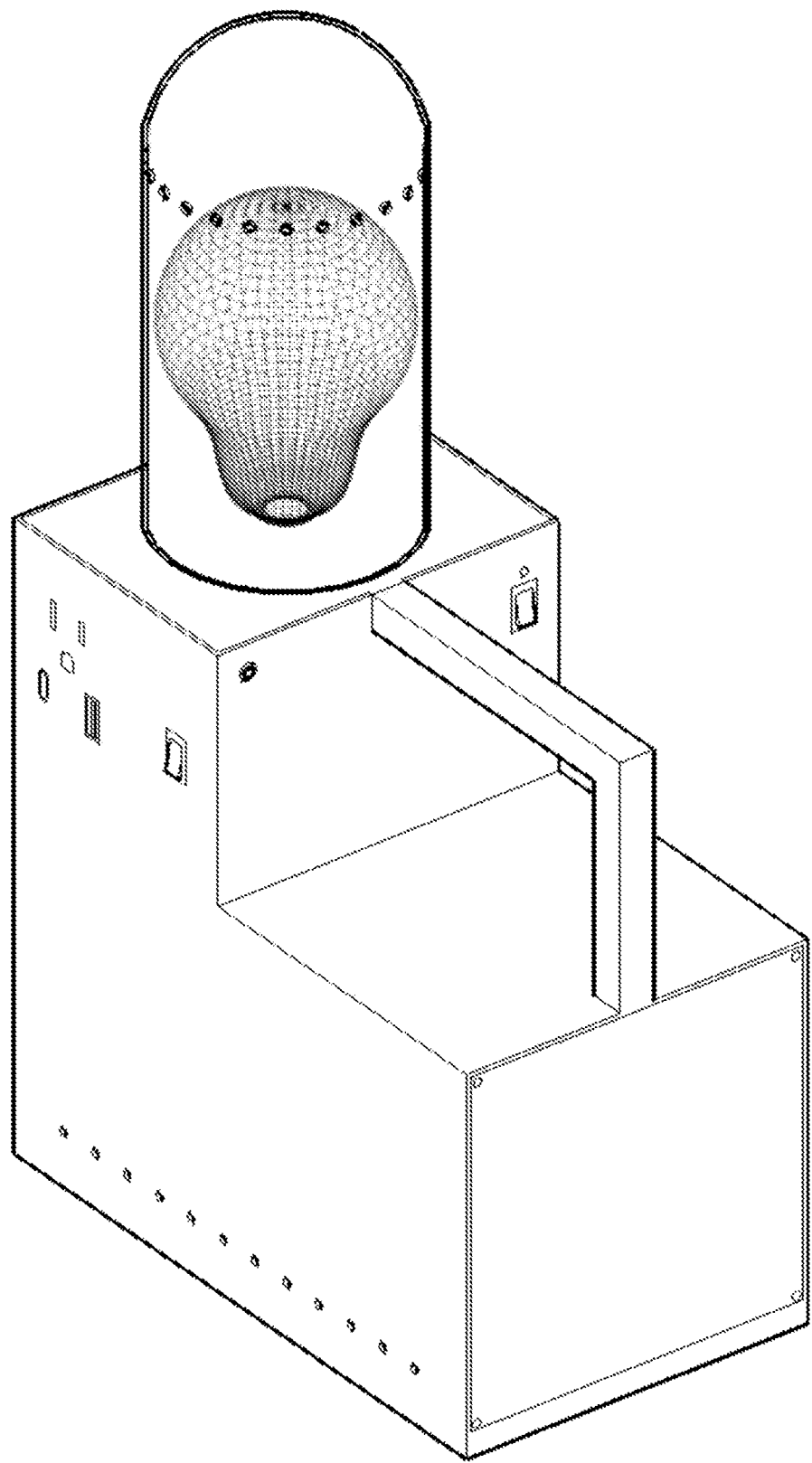
FIG. 3 is a 3D view of the invention

As depicted in FIGS. 1-3, the rechargeable battery can be accessed via a battery door on the bottom polygonal part of the rigid body. Furthermore, as depicted in FIG. 2 there is a dividing wall on the inside of the rigid body that divides an inside portion of the bottom polygonal part from an inside portion of a top polygonal part. Consequently, the battery is physically separated from the circuit of electronic components housed in the top polygonal part, while remaining electrically inter-connected. Electronic components include the inverter module and a cooling fan and are housed in the top polygonal part as depicted in FIGS. 1-3.

As further shown in FIGS. 1-3, in the depicted embodiment the plastic handle is molded together with the outer plastic shell. A standard 120V 15 Watt LED bulb is placed in a standard bulb holder on the top of the shell (specifically, the portion that is the top polygonal part) next to the handle. The bulb is enclosed in a transparent plastic compartment as shown. The battery is connected to the inverter through a main switch and the inverter to the bulb through a second switch. The battery is connected to a 12V DC input socket on the plastic shell (as shown in FIGS. 1-3) for charging the battery with external 12V current from the solar panel or any other 12V source (using a charge controller). The electronics compartment houses a 120V AC outlet and one USB 3.0 outlet and one USB 'C' outlet, all of which are accessible from outside. There is also an indicator LED light on the shell which indicates positive current flow from the battery to the inverter module. The battery compartment and bulb enclosure both have ventilation holes with a diameter of 0.04 inches (1 mm).

The invention is operated by the two external switches on the shell as described above. The main switch controls current flow from the battery to the inverter while the second switch controls only the current flow to the light bulb. This enables the 120V AC outlet and the USB outlets to be used without turning on the bulb. Once the battery is charged, it is disconnected from the 12V source and can be carried anywhere and used as a portable light/lamp continuously for 9-12 hours. The invention can be charged and/or powered in the day time with the solar panel on a daily basis (8-10 hours) which will enable the lamp to be used continually on a daily basis at night.

The invention is compact and portable light, using a 12V 15-25 W solar panel to charge a 12V 12-18 Ah Li-ion [LiFePO$_4$] or deep cycle Lead-acid battery. After exposure to 8-10 hours of sunlight, the 12V DC current fully charges the 12V battery. The battery's 12V DC current is then fed to a 150 W inverter module, which produces 120V AC current from the 12V DC current. This current is then fed to a standard 120V 15 W LED bulb, producing 1500 lumens of 5000K (daylight equivalent) high-intensity light that can last continuously for 9-12 hours. The invention provides 360-degree lighting on camping trips, remote off-grid cabins, homes, and other locations, as well as in emergencies. It is also equipped with a standard 120V AC outlet and USB 3.0 and USB 'C' outlets for charging electronic devices.

The rechargeable battery can be charged from an external power source by plugging into an external input port on the outside of the top polygonal part. The external power source can be a 12V cigarette lighter socket of an automobile or other 12V source using a charge controller. It can also be charged at home using a suitable 120V to 12V step-down adapter.

The rigid body of the invention is made of a plastic material, and the bulb cover is made of transparent plastic. The bulb holder, the 120V outlet, and USB outlets are also housed inside the electronics compartment but are accessible from outside. There are two switches placed on the walls of the plastic body. One switch controls the current flow from the battery to the inverter, and the other controls the current flow from the inverter to the bulb. This arrangement permits the use of the 120V and USB outlets without switching on the bulb. There is also an indicator light that confirms current flow from the battery to the inverter. The handle of the light is molded into the rigid body, extending from the bottom polygonal part to the top polygonal part, as shown in FIGS. 1-3. Both the bulb and the battery are easily accessible and can be easily removed for change or replacement, as required. Standard LED bulbs that are capable to be used with the invention typically have a lifespan of about 10,000 hours, while a standard Li-ion (LiFePO$_4$) battery has a 9-10 year lifespan and a standard deep cycle Lead-acid battery has a 1-2 year lifespan.

Utilizing these components, the invention can provide high-intensity light for a very long period of time, in remote locations using solar energy.

The invention claimed is:

1. A portable solar-powered lamp comprising:
a rigid body for supporting and/or housing all components of the portable solar-powered lamp, the rigid body comprising:
   a bottom polygonal part,
   a top polygonal part, wherein the bottom polygonal part has a larger surface area than the top polygonal part;
   a main exterior portion comprising:
      an exterior surface of the bottom polygonal part and an exterior surface of the top polygonal part that are monolithically formed together;
      a handle extending from an upper surface of the exterior surface of the bottom polygonal part to a first side surface of the exterior surface of the top polygonal part;
   an interior portion comprising a dividing wall, the dividing wall isolating an inside of the bottom polygonal part from an inside of the top polygonal part;
a rechargeable battery housed within the inside of the bottom polygonal part;
an external input port formed on the first side surface of the top polygonal part and configured to connect to an external 12V power source;
a circuit comprising electronic components, wherein the circuit is housed within the inside of the top polygonal part,
the electronic components comprising:
   an inverter; and
   a first switch connecting the rechargeable battery to the inverter;
wherein the circuit and the rechargeable battery are electrically connected together, and the rechargeable battery is configured for receiving power from the external input port and providing power to the circuit;
an external solar panel configured to be used as the external power source, and the external solar panel is further configured to physically connect with the external input port thereby electrically connecting the external solar panel to the rechargeable battery to provide DC power to the rechargeable battery;
a transparent cover mated with an upper surface of the top polygonal part; and
a light-emitting element housed within the transparent cover and electrically connected to the circuit.

2. The portable solar-powered lamp of claim 1, wherein the rigid body comprises a plastic material.

3. The portable solar-powered lamp of claim 2, wherein the transparent cover further comprises a first set of ventilation holes, and the bottom polygonal part comprises a second set ventilation holes formed on both sides of a lateral dimension of the exterior surface of the bottom polygonal part.

4. The portable solar-powered lamp of claim 3, wherein both the top polygonal part and the bottom polygonal part have a shape of a cube or cuboid, and the lateral dimension of the exterior surface of the bottom polygonal part is approximately 7.10" and a lateral dimension of an exterior surface of the top polygonal part is approximately 4.10".

5. The portable solar-powered lamp of claim 1, wherein the exterior surface of the top polygonal part has a second side surface, the second side surface comprises additional electronic components, the additional electronic components comprising:
   a 120V AC outlet;
   a USB-C port; and
   a USB 3.0 port.

6. The portable solar-powered lamp of claim 5, wherein the rechargeable battery is a 12V 12-18 Ah battery, and the inverter is a 150 W 12V DC to 120V AC inverter module.

7. The portable solar-powered lamp of claim 6, wherein the rechargeable battery is a Lithium-Ion battery or a lead-acid battery.

8. The portable solar-powered lamp of claim 7, wherein the Lithium-Ion battery comprises LiFePO$_4$.

9. The portable solar-powered lamp of claim 6, wherein the rechargeable battery is directly electrically connected to the inverter.

10. The portable solar-powered lamp of claim 6, wherein the light-emitting element is an LED that is a 120V 15 W light source capable of producing light of 1500 lumens at 5000K.

11. The portable solar-powered lamp of claim 10, wherein the LED is capable of continuously outputting light for about 9-12 hours when the LED draws power from the rechargeable battery via the inverter when the rechargeable battery is fully charged.

12. The portable solar-powered lamp of claim 6, wherein the second side surface of the top polygonal part has a second switch, and the second switch electrically connects the inverter to the light-emitting element.

13. The portable solar-powered lamp of claim 6, further comprising a cooling fan for reducing the temperature within the portable solar-powered lamp.

14. The portable solar-powered lamp of claim 1, wherein the 12V external power source further comprises:
a cigarette lighter socket of an automobile; or
a conventional 120V wall outlet of a building using a 120V to 12V step-down adapter to connect the conventional 120V wall outlet to the external input port.

15. The portable solar-powered lamp of claim 1, wherein the exterior surface of the bottom polygonal part has a battery door for accessing the rechargeable battery.

16. The portable solar-powered lamp of claim 1, wherein the external solar panel has a wattage of 15 W to 25 W.

17. A portable solar-powered lamp comprising:
a rigid body for supporting and/or housing all components of the portable solar-powered lamp, the rigid body comprising:
  a bottom cuboid part,
  a top cuboid part, wherein the bottom cuboid part has a larger surface area than the top cuboid part;
  a main exterior portion comprising:
    an exterior surface of the bottom cuboid part and an exterior surface of the top cuboid part that are monolithically formed together;
    a handle extending from an upper surface of the exterior surface of the bottom cuboid part to a first side surface of the exterior surface of the top cuboid part;
    an interior portion comprising a dividing wall, the dividing wall isolating an inside of the bottom cuboid part from an inside of the top cuboid part; and
    the exterior surface of the bottom cuboid part has a battery door for accessing the inside of the bottom cuboid part;
a rechargeable battery that is a 12V 12-18 Ah battery, wherein the rechargeable battery is housed entirely within the inside of the bottom cuboid part;
a 12V external input port formed on the first side surface of the top cuboid part and configured to connect to an external 12V power source;
a circuit comprising electronic components, wherein the circuit is housed within the inside of the top cuboid part,
the electronic components comprising:
  an inverter that is a 150 W 12V DC to 120V AC inverter module;
  a first switch connecting the rechargeable battery to the inverter;
  wherein the circuit and the rechargeable battery are electrically connected together, the rechargeable battery is configured for receiving power from the external input port and providing power to the circuit, and the rechargeable battery is directly electrically connected to the inverter;
an external solar panel configured to be used as the external power source, the external solar panel is further configured to physically connect with the external input port thereby electrically connecting the external solar panel to the rechargeable battery to provide DC power to the rechargeable battery, and the external solar panel has a wattage of 15 W to 25 W;
a transparent cover mated with an upper surface of the top cuboid part; and
an LED that is a 120V 15 W light source capable of producing light of 1500 lumens at 5000K, the LED is housed within the transparent cover and electrically connected to the circuit, and the LED is capable of continuously outputting light for about 9-12 hours when the LED draws power from the rechargeable battery via the inverter when the rechargeable battery is fully charged;
wherein the external 12V power source further comprises:
  a cigarette lighter socket of an automobile; or
  a conventional 120V wall outlet of a building using a 120V to 12V step-down adapter to connect the conventional 120V wall outlet to the external input port;
wherein the exterior surface of the top cuboid part has a second side surface, the second side surface comprises additional electronic components, the additional electronic components comprising:
  a 120V AC outlet;
  a USB-C port; and
  a USB 3.0 port.

18. The portable solar-powered lamp of claim 17, wherein the transparent cover further comprises a first set of ventilation holes, and the bottom cuboid part comprises a second set ventilation holes formed on both sides of a lateral dimension of the exterior surface of the bottom cuboid part.

19. The portable solar-powered lamp of claim 18, wherein the lateral dimension of the exterior surface of the bottom cuboid part is approximately 7.10" and a lateral dimension of an exterior surface of the top cuboid part is approximately 4.10".

20. The portable solar-powered lamp of claim 17, wherein the second side surface of the top cuboid part has a second switch, and the second switch electrically connects the inverter to the LED.

* * * * *